United States Patent
Grenier et al.

[11] 3,717,762
[45] Feb. 20, 1973

[54] SENSING MATRIX FOR A RADIOACTIVITY-DISTRIBUTION DETECTOR

[75] Inventors: Raymond P. Grenier, Wilmington; William F. Welsh, Waltham, both of Mass.

[73] Assignee: Baird-Atomic, INc., Bedford, Mass.

[22] Filed: Sept. 21, 1970

[21] Appl. No.: 74,030

[52] U.S. Cl. ........................ 250/71.5 R, 250/71.5 S
[51] Int. Cl. ................................................ G01t 1/20
[58] Field of Search .............. 250/71.5 R, 71.5 S, 227

[56] References Cited

UNITED STATES PATENTS

| | | | |
|---|---|---|---|
| 3,509,341 | 4/1970 | Hindel et al. | 250/71.5 S |
| 3,509,339 | 4/1970 | Doehner | 250/71.5 R X |
| 3,539,806 | 11/1970 | Humphrey | 250/71.5 R |

*Primary Examiner*—Archie R. Borchelt
*Attorney*—Morse, Altman and Oates

[57] ABSTRACT

In a radioactivity-distribution detector, an array of light conduits in spaced relation to a plurality of visible light emitters defining a grid network is provided for identifying and specifying the location of an active or light generating emitter. The conduits are disposed in a plurality of row pairs, the first of the pair being in bisecting staggered spaced relation to the second of the pair. Specific ones of the light emitters are in exclusive spatial relationship with selected ones of the light conduits and other ones of the light emitters are in spatial relationship with a specified combination of light conduits, whereby each emitter is identified by either a single light conduit or a unique combination of light conduits.

12 Claims, 7 Drawing Figures

INVENTORS
RAYMOND P. GRENIER
WILLIAM F. WELSH
BY
*Morse Altman & Oates*
ATTORNEYS

PATENTED FEB 20 1973 3,717,762

INVENTORS
RAYMOND P. GRENIER
WILLIAM F. WELSH
BY
Morse, Altmant Oates
ATTORNEYS

SENSING MATRIX FOR A RADIOACTIVITY-DISTRIBUTION DETECTOR

BACKGROUND OF THE INVENTION

1. Field of the Invention

The present invention relates to radioactivity-distribution detectors and more particularly to a sensing matrix for such detectors.

2. Description of the Prior Art

Various types of radioactivity-distribution detectors have been developed for the purpose of determining the location of radioactive material injected in diagnostic amounts into a human body or the like. In one type, the detecting element comprises a single tube which must be manually moved over the surface being surveyed in order to locate the position of the radioactive material or to determine the distribution of radiation over the area. Such procedure is laborious and time consuming even for relatively small areas. In another type, a scintillator and a plurality of phototubes spaced at a moderate distance therefrom are used to survey overlapping areas of the body. The data output signals from the phototubes are applied to electronic circuits in order to identify the location of the active scintillator. Generally, these detectors are complex in construction and costly in production.

SUMMARY OF THE INVENTION

An object of the present invention is to provide a sensing matrix for a radioactivity-distribution detector characterized by an array of light conduits which are disposed in superimposition with a plurality of visible light emitters defining a grid network. The conduits are disposed in a plurality of row pairs, the first of the pair being in bisecting staggered spaced relation to the second of the pair. The orientation of the emitter grid network with respect to the conduit array is such that specific ones of the emitters are in exclusive spaced relationship with selected ones of the conduits and other ones of the emitters are in spaced relationship with a specific combination of conduits. That is, the location of each emitter is identified by either a single conduit or a unique combination of conduits. The combination of conduit array and emitter grid network is such as to provide an expeditious and inexpensive sensing matrix for a radioactivity-distribution detector.

The invention accordingly comprises the system possessing the construction, combination of elements, and arrangemeng of parts that are exemplified in the following detailed description, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENT

Figure 1:
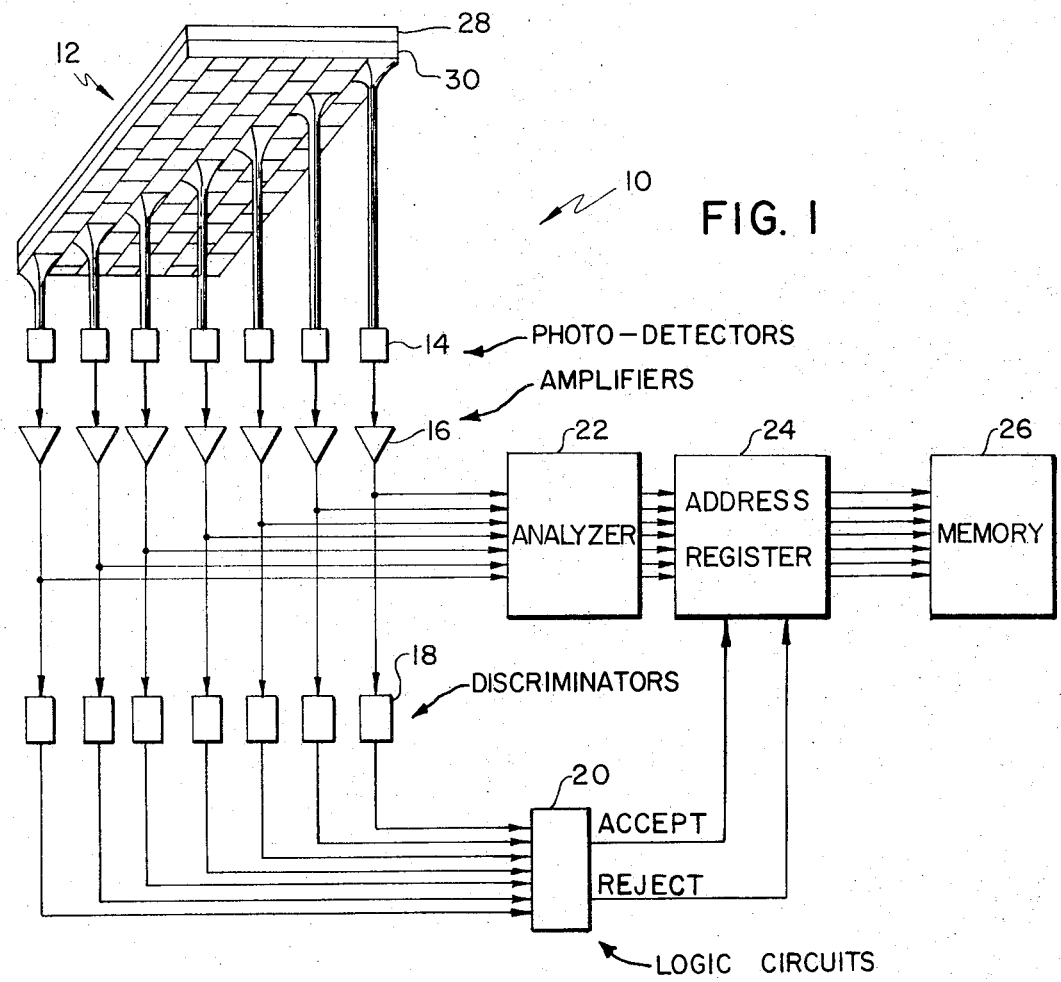
FIG. 1 is a schematic diagram showing a radioactivity-distribution detector having a sensing matrix made according to the invention.

Referring now to FIG. 1, there is shown a radioactivity-distribution detector 10 for identifying the location of radiation within a specimen undergoing diagnosis. Generally, the system comprises a sensing matrix 12, photo-detectors 14, amplifiers 16, discriminators 18, logic circuits 20, and analyzer 22, an address register 24, and a memory 26. Sensing matrix 12 includes a grid network of light emitters 28 which are disposed in superimposition with an array of light conduits 30. Each emitter 28, for example a scintillator composed of a thallium-activated sodium iodide crystal or a cesium crystal, the profile of the crystal defining a cylinder or a parallelepiped, emits flashes of visible light when struck by radiation.

Figure 2:
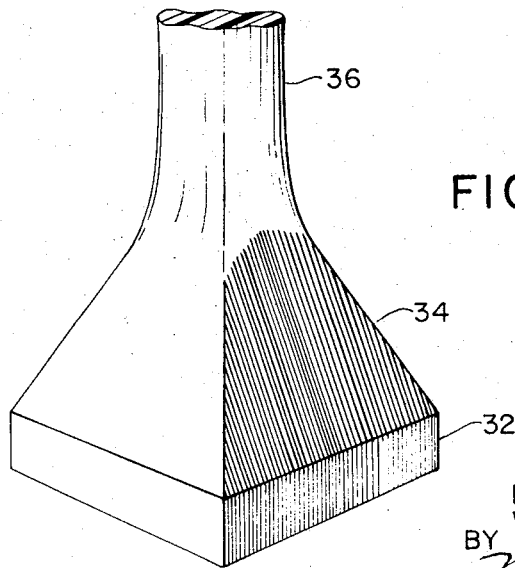
FIG. 2 is a perspective of a light conduit made according to the invention.

As best shown in FIG. 2, by way of example, light conduit 30 includes an input end 32, a medial portion 34, and an output end 36. The profile of input end 32 is substantially square in right section and the profile of output end 36 is substantially circular in right section. Medial portion 34 defines a transitional section having a substantially square profile, in end view, at one face thereof and a substantially circular profile, in end view, at the opposite face thereof. For best results, each light conduit is composed of a material which transmits the wavelengths emitted by the scintillator, for example an acrylic resin such as methyl methacrylate, a clear epoxy, glass etc.

As hereinafter described, the orientation of emitters 28 with respect to conduits 30 is such that specific ones of the emitters are in exclusive spaced relationship with selected ones of the conduits and other ones of the emitters are in spaced relationship with a specific combination of the conduits. Accordingly, the location or X–Y position of any one emitter is identified by either a single conduit or a unique combination of conduits.

The visible light emitted by an activated scintillator is optically coupled to photo-detectors 14 via light conduits 30, each conduit being associated with a specific photo-detector. In conventional manner, an output signal is generated by each photo-detector 14 when visible light is presented at its input. In consequence, the signal as at the output of a single photo-detector or the signals as at the output of a specific combination of photo-detectors identifies the X-Y position of any one activated scintillator. The signal at the output of each photo-detector 14 is applied to the input terminals of analyzer 22 and discriminators 18 via amplifiers 16. Each discriminator 18 is associated with one amplifier and each amplifier is connected to one photo-detector 14. In the illustrated embodiment, by way of example, analyzer 22 is a single channel analyzer which generates an analog pulse when the signal at its input terminals is within a specific amplitude range or energy window and each discriminator is a low level discriminator which generates a pulse in response to a signal at its input terminal.

The analog pulses as at the output of analyzer 22 are fed into address register 24 and the pulses as at the output of discriminator 18 are applied to the input terminals of logic circuits 20. In response to the pulses as at the input of terminals of logic circuits 20, either an an ACCEPT signal or a REJECT signal is generated by logic circuits and is applied to address register 24. If the signals as at the output of discriminators 18 indicates activation of more than one scintillator, i.e., more than one X-Y position, a reject signal is generated by logic circuits 20. In consequence, address register 24 is reset and the analog pulses applied thereto from analyzer 22 are rejected. If the signal as at the output of discriminators 18 indicates activation of only one scintillator, i.e., only one X-Y position, an accept signal is generated by logic circuits 20. In consequence, the X-Y position of the activated scintillator is entered into address register 24 and is stored in memory 26.

Figure 3:
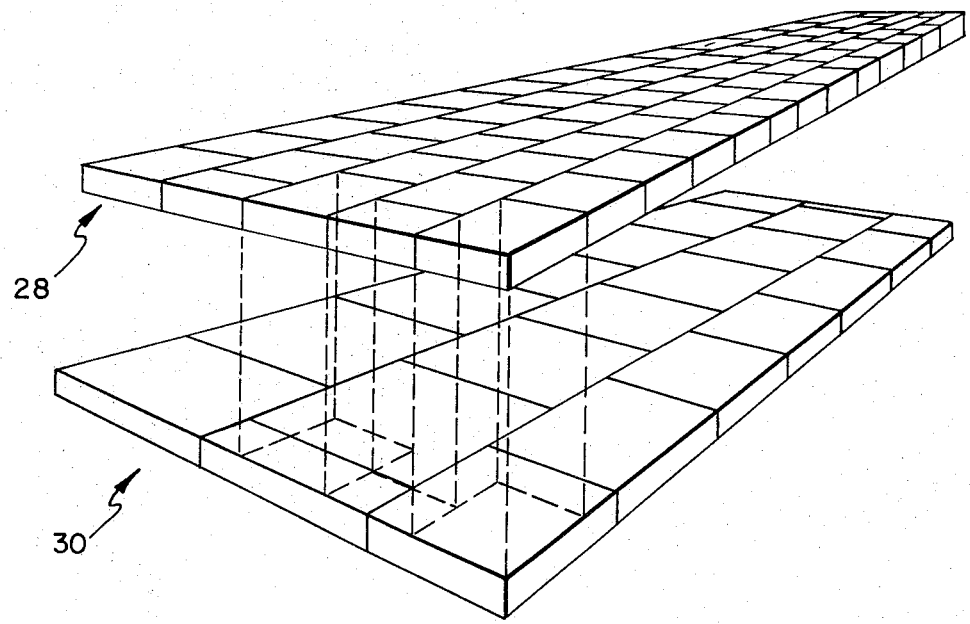
FIG. 3 is an exploded view in perspective of the sensing matrix of FIG. 1.
Figure 4:
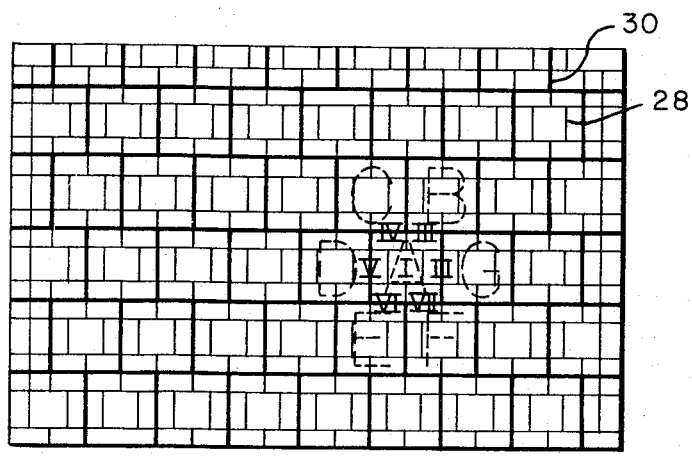
FIG. 4 is a plan view of FIG. 3.

As previously stated, the orientation of light conduits 30 with respect to scintillators 28 is such that the X-Y position of any one scintillator is identified by either a single light conduit or a unique combination of light conduits. In order to facilitate an understanding of the manner by which the X-Y position of any one scintillator is obtained, reference is now made to FIGS. 3 and 4. Generally, scintillators 28 are disposed in a plurality of row pairs, the first of the pair being in bisecting staggered spaced relation to the second of the pair. It is to be understood that, in alternate embodiments, scintillators 28 are disposed in other than a plurality of bisecting, staggered row pairs, for example, a grid network of rows and columns. As best shown in FIG. 4, the profile of each scintillator 28 and each light conduit 30, in right section, is substantially square.

Generally, light conduits 30 are disposed in an array defining a plurality of row pairs, the first of the pair being in bisecting staggered spaced relation to the second of the pair. The array of light conduits 30 is disposed in superimposition with scintillators 28 in such a way that each light conduit monitors one scintillator exclusively and one-half of the six adjacent scintillators, whereby each scintillator is identified by a single light conduit or a unique combination of light conduits.

By way of example, in order to facilitate an understanding of the technique by which the X-Y position of a scintillator is obtained, six adjacent light conduits will be denoted by the alphanumeric characters A, B, C, D, E, F, and G and six adjacent scintillators will be denoted by the Roman numerals I, II, III, IV, V, and VI. The following table, showing the relationship between the scintillators and light conduits, may be obtained:

| Scintillator | Light Conduits |
| --- | --- |
| I | A |
| II | A,G |
| III | A,B |
| IV | A,C |
| V | A,D |
| VI | A,E |
| VII | A,F |

Accordingly, it will be seen that scintillator I is identified exclusively by light conduit A, scintillator II is identified by a combination of light conduits A and G, scintillator III is identified by a combination of light conduits A and B, and so on. It will be readily appreciated that the position of each scintillator in sensing matrix 12 is identified in a similar manner. In other words, by assigning a patticular code to each X-Y position in sensing matrix 12, the X-Y position of each scintillator is known. It will be noted that, the arrangement of scintillators 28 and light conduits 30, as illustrated in FIG. 4, is such that the number of photo-detectors 14 required to distinguishably identify the position of any scintillator is reduced by a factor of four. In other words, each photo-detector 14 monitors the area defined by four scintillators.

Figure 5:
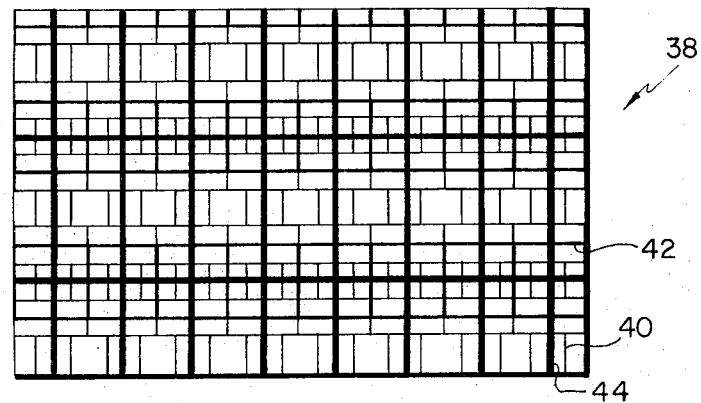
FIG. 5 is a plan view of an alternate embodiment of FIG. 4.

Referring now to FIG. 5, there is shown a sensing matrix 38 which is an alternate embodiment of sensing matrix 12. Sensing matrix 38 comprises a grid network of light emitters 40, an array of light conduits 42, and an array of light conduits 44. Light emitters 40 and light conduits 42, 44 are composed of like materials as light emitters 28 and light conduits 30, respectively.

Light emitters 40 are disposed in a similar configuration and are of the same right section profile as light emitters 28. Light conduits 42 are disposed in a similar spaced relation to light emitters 40 as that, of light conduits 30 and light emitters 28. The right section profile of each light conduit 42 is the same as the right section profile of each input end 32 of light conduit 30. Each light conduit 44 includes an input end, a medial portion, and an output end which corresponds to input end 32, medial portion 34, and output end 36 of light conduit 30. The profiles of the input end and one face of the medial portion of each light conduit 44 are substantially rectangular, corresponding to the substantially square profile of input end 32 and face of medial portion 34, respectively. The profiles of the other face of the medial portion and output end of each light conduit 44 are circular as in the case of medial portion 34 and output end 36, respectively.

Generally, the array of light conduits 44 defines a grid network of rows and columns. The array of light conduits 44 is disposed in superimposition with the array of light conduits 42 in such a way that each light conduit 44 is in bisecting spaced relationship with four adjacent light conduits 44. In other words, each light conduit 44 monitors one half of four adjacent light conduits 42. The mode of operation of sensing matrix 38 is similar to that described for sensing matrix 12 with the exception that the number of photodetectors required to distinguishably identify the position of any scintillator is reduced by a factor of two from that number of photo-detectors required for sensing matrix 12.

Figure 6:
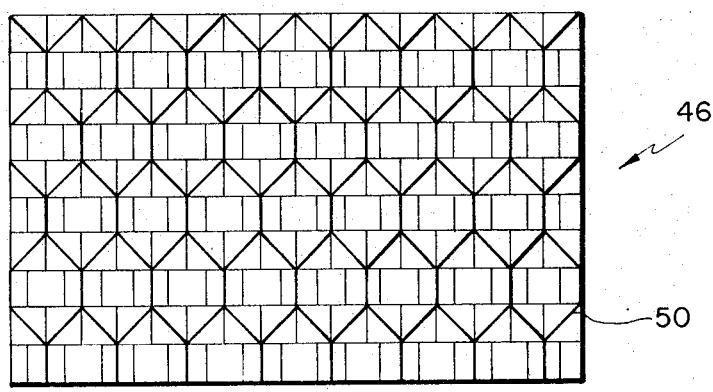
FIG. 6 is a plan view of a second embodiment of the invention.
Figure 7:
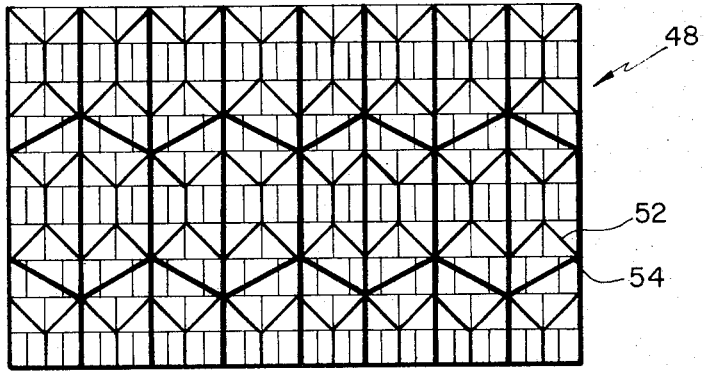
FIG. 7 is a plan view of an alternate embodiment of FIG. 6.

Referring now to FIGS. 6 and 7, there is shown a second embodiment of the invention in the form of sensing matrices 46 and 48, respectively. Sensing matrix 46 is similar to sensing matrix 12 with the exception that the profile of the input end of each light conduits 30 is hexagonal, as indicated at 50, rather than square. Sensing matrix 48 is similar to sensing matrix 38 with the exception that the profile of each light conduit 42 is hexagonal, as indicated at 52, rather than square and the profile of each light conduit 44 is a pair of trapazoids defining a hexagon, as indicated at 54, rather than rectangular. The modes of operation of sensing matrices 46 and 48 are similar to that of sensing matrices 12 and 38, respectively.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A sensing matrix for a radioactivity distribution detector comprising:
   a. a plurality of light emitters defining a grid network; and
   b. a plurality of light conduits defining an array which is in superimposition with said grid network, specific ones of said light emitters and specific ones of said light conduits disposed in exclusive spaced relationship and specific other ones of said light emitters and a specific unique combination of said light conduits disposed in exclusive spaced relationship, whereby the position of each one of said specific ones of said light emitters is identified only by one of said specific ones of said light conduits and the position of each one of said specific other ones of said light emitters is identified only by each one of said specific unique combination of said light conduits.

2. A sensing matrix for a radioactivity-distribution detector comprising:
   a. a plurality of light emitters defining in a grid network; and
   b. a plurality of light conduits defining an array which is in super-imposition with said grid network, specific ones of said emitters being in exclusive spaced relationship with selected ones of said conduits and other ones of said emitters being in spaced relationship with a unique combination of said conduits;
   c. said light emitters disposed in a plurality of row pairs, the first of said pair being in bisecting staggered spaced relation to the second of said pair.

3. The sensing matrix as claimed in claim 2 wherein each said light emitter is a scintillator.

4. The sensing matrix as claimed in claim 3 wherein said scintillator is composed of a thallium-activated sodium iodide crystal.

5. A sensing matrix for a radioactivity-distribution detector comprising:
   a. a plurality of light emitters defining in a grid network; and
   b. a plurality of light conduits defining an array which is in super-imposition with said grid network, specific ones of said emitters being in exclusive spaced relationship with selected ones of said conduits and other ones of said emitters being in spaced relationship with a unique combination of said conduits;
   c. said light conduits disposed in a plurality of row pairs, the first of said pair being in bisecting staggered spaced relation to the second of said pair.

6. The sensing matrix as claimed in claim 5 wherein each said light conduit is composed of an acrylic resin.

7. A radioactivity-distribution detector comprising:
   a. sensing matrix means including a plurality of visible light emitters defining a grid network in superimposition with a plurality of light conduits defining an array, specific ones of said emitters being in exclusive spaced relationship with selected ones of said conduits and other ones of said emitters being in spaced relationship with a unique combination of said conduits;
   b. a plurality of photo-detecting means, each said photo-detecting means optically coupled to each said light conduit, respectively, each said photo-detecting means generating an output signal in response to visible light at its input;
   c. analyzer means electrically communicating with said photo-detecting means for generating an analog pulse in response to selected signals generated by said photo-detecting means; and
   d. address register and memory means electrically communicating with said analyzer means for receiving and storing said analog pulses in address positions corresponding to the location of said emitters in said sensing matrix.

8. The radioactivity-distribution detector as claimed in claim 7 including:
   a. discriminator means electrically communicating with said photodetecting means for generating a pulse in response to each signal generated by said photo-detecting means; and
   b. logic means electrically communicating with said discriminator means and said address register and memory means, said logic means generating an accept signal when the pulse as at the output of said discriminator means is indicative of the position of one of said emitters, said logic means generating a reject signal when the pulse as at the output of said discriminator means is indicative of the position of at least two of said emitters, said accept and reject being applied to said address register and memory means, said analog pulse as at the output of said analyzer means being stored in said address register and memory means only when an accept signal is generated by said logic means.

9. A sensing matrix for a radioactivity-distribution detector comprising:
   a. a plurality of light emitters defining in a grid network;
   b. a plurality of light conduits defining a first array which is in superimposition with said grid network, specific ones of said emitters being in exclusive spaced relationship with selected ones of said conduits of said first array and other ones of said emitters being in spaced relationship with a unique combination of said conduits of said first array; and
   c. a plurality of light conduits defining a second array which is in superimposition with said first array, each said conduit of said second array being in bisecting spaced relationship with four adjacent conduits of said first array.

10. The sensing matrix as claimed in claim 9 wherein said light emitters are disposed in a plurality of row pairs, the first of said pair being in bisecting staggered spaced relation to the second of said pair.

11. The sensing matrix as claimed in claim 9 wherein said light conduits of said first array are disposed in a plurality of row pairs, the first of said pair being in bisecting staggered spaced relation to the second of said pair.

12. The sensing matrix as claimed in claim 9 wherein said light conduits of said second array are disposed in a grid network of rows and columns.

* * * * *